Dec. 22, 1925.

1,566,370

J. W. BRISCOE

CHUCK

Filed Feb. 20, 1925

Witnesses:

Inventor:
JOHN W. BRISCOE,
by:
his Attorney.

Patented Dec. 22, 1925.

1,566,370

UNITED STATES PATENT OFFICE.

JOHN W. BRISCOE, OF INGRAM, PENNSYLVANIA.

CHUCK.

Application filed February 20, 1925. Serial No. 10,631.

*To all whom it may concern:*

Be it known that I, JOHN W. BRISCOE, a citizen of the United States, residing in Ingram, in the county of Allegheny and State of Pennsylvania, have invented certain new and useful Improvements in Chucks, of which the following is a specification.

This invention relates to chucks for work blanks during operations thereon, and in particular to chucks for a work blank such as a railway car wheel having a central hole upon a rotatable work supporting table.

An object of the invention is to provide a simple, powerful and efficient chuck for work blanks on the work supporting table of a machine tool which consists essentially of a suitable body or cage having work engaging jaws mounted therein adapted to be actuated to hold or release work by vertical movement of a central element, and without the removal and replacement of parts forming the mechanism.

A further object of the invention is to provide a chuck for holding car wheels or similar blanks against the driving means on a work supporting table which will be power operated and which, during the normal operation of the machine, will be entirely automatic.

A still further object is to provide a chuck having the novel construction, design and combination of parts hereinafter described and illustrated in the accompanying drawings.

In the drawings:—

Figure 1:
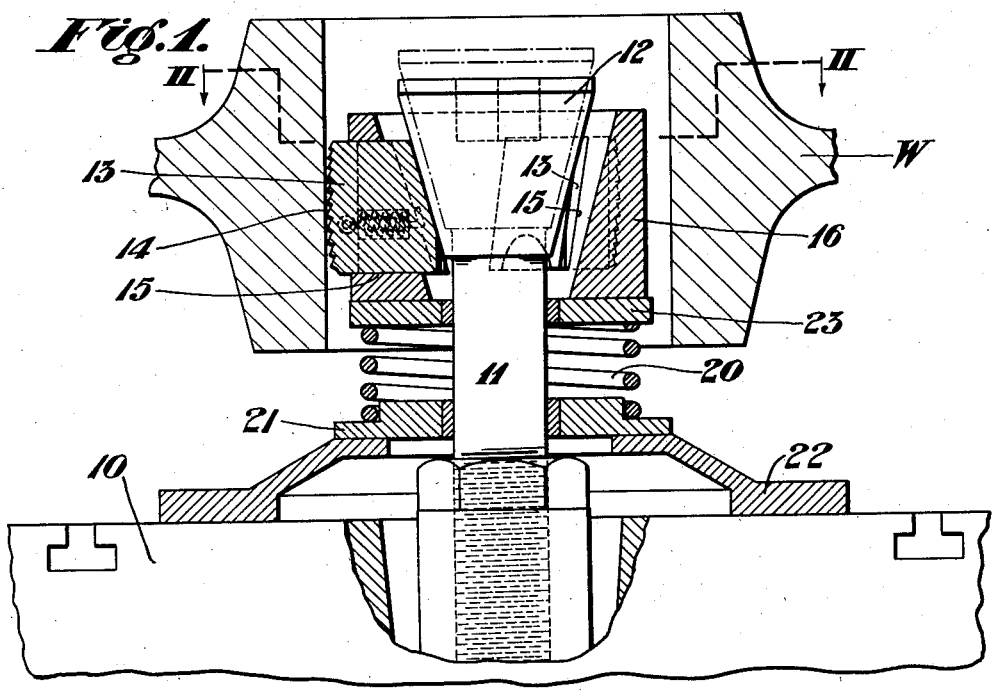
Figure 1 is a vertical sectional view of the holding down mechanism forming the present invention.
Figure 2:
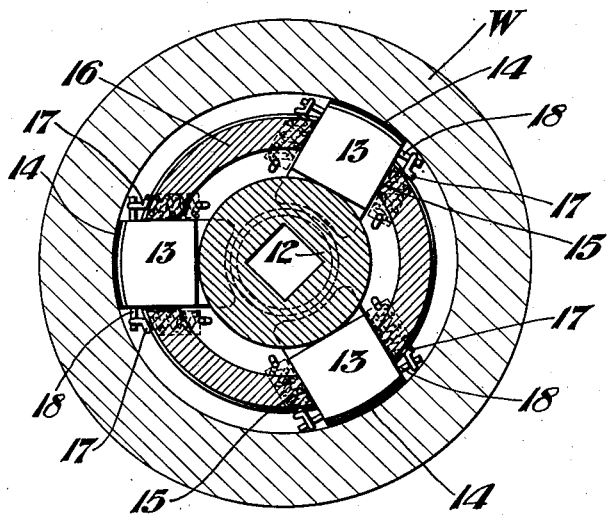
Figure 2 is a horizontal sectional view taken on line II—II of Figure 1.
Figure 3:
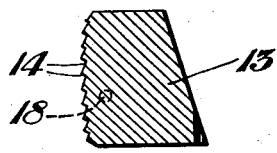
Figure 3 is a sectional view of one of the work engaging jaws.
Figure 4:
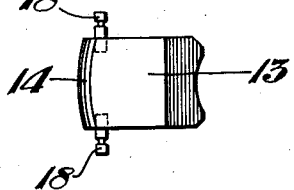
Figure 4 is a plan view of the same.

In the above drawings, I have shown but one embodiment of a device forming my invention, which is now deemed preferable, but it is to be understood that changes and modifications may be made within the scope of the appended claims without departing from the spirit of the invention.

Briefly and in its broadest aspect, my invention comprises the following principal parts—first, an annular member having jaws radially disposed therein and adapted to engage the walls of a hole in the work blank; second, an element movable vertically relative to the annular member and engaging the inner beveled ends of the jaws; third, resilient means supporting the annular member slightly above its operative position; and fourth, means normally forcing the jaws inwardly against a conical portion on the vertically movable element.

Referring more particularly to the drawings, my invention is shown as a chuck for railroad car wheels and is adapted for use particularly with a vertical car wheel lathe. The work supporting table 10 (shown fragmentarily) has, extending vertically at its axis of rotation, a member 11. This member or rod 11 is adapted to be reciprocated vertically by means of suitable fluid pressure or pneumatically operated mechanism (not shown). Preferably, also, the rod 11 may be permitted to float laterally so that it may center itself relative to the bore through the work blank being operated on.

At the upper end of this vertically movable member 11 is a conical portion or head 12 which is adapted to engage the inner beveled ends of a plurality of work engaging jaws 13. In the present embodiment three jaws 13 are shown. These jaws 13 are, at their outer ends, provided with serrations or teeth 14 adapted to engage and grip the walls of the central bore of the car wheels or other blank W being operated on. Also, these jaws are slidable radially in slots 15 provided therefor in an annular member or cage 16. The annular member 16 is adapted to fit easily within the central bore of the work blank and provides a mounting for the radially movable jaws 13. The rod 11 is movable within a conical opening extending through the annular member 16. Resilient supporting means to be presently more fully described are provided on which the annular member 16 rests. From the above descrtption it will be seen that downward movement of the vertically movable element 11 will force the head 12 against the jaws 13, and thus simultaneously move said jaws outwardly so that they will not only grip, but also force the wheel downward to engage it upon driving jaws (not shown), which may be provided on the supporting table therefor. The jaws 13 are normally resiliently forced inwardly by means of small helical springs 17 attached on opposite sides to pins 18 outstanding from the jaws. The inner ends of the springs engage upon the inner walls of the annular member 16. Movement upward of the vertically moving element 11 will therefore permit the jaws 13 to be moved inwardly by the springs 17 to disengage the jaws from the walls of the work piece W.

Normally supporting the annular member in the position shown in Figure 1 is a short helical spring 20. This may be disposed between a bottom ring 21 resting upon a member 22 on the work supporting table 10. The upper end of the spring 20 bears against a top plate 23 upon which the annular member 16 rests. The spring 20 is shown in its expanded position in Figure 1, with the member 16 in its highest position. The spring 20 is adapted to be compressed a limited amount when the rod 11 is moved downwardly, so as to move the chuck and work piece downwardly into engagement with the driving jaws (not shown), on the table 10. Vertical movement upward of the movable member 11 will first cause the annular member 16 and the radially movable jaws 13 to move upward until the spring 20 has expanded to its maximum limit. Continued upward movement of the element 11 causes the conical portion or head 12 to move into the position shown in dotted lines above the annular member 16 so that the jaws 13 may be drawn inwardly and away from engagement with the walls of the work blank W by the springs 17.

To actuate the chuck it is only necessary to force the vertically movable element 11 downward. This first causes the conical portion or head 12 to contact with the inner ends of the jaws 13 so that these jaws 13 are moved outwardly into engagement with the blank W being operated upon. Continued downward movement of member 11 will forcibly move the jaws 13 and annular member 16 downward against the resilience of the spring 20. This causes the work blank W to be forced downward to engage it against driving plates or other means provided on the work supporting table 10.

From the above it will be seen that the chuck does not require parts to be removed and replaced each time a work blank W is removed or mounted on the work table 10. Also, as soon as the vertically movable element 11 is moved downward the radially movable jaws 13 are forced outwardly by the action of their beveled inner ends against the conical portion 12 and by the action of the annular member 16 which, being normally held upward by spring 20, forces the jaws outward into contact with the work blank W.

While I have shown and described one preferred embodiment of my invention as applied to a vertical car wheel lathe, it will be understood that the invention can be applied to other apparatus than vertical car wheel lathes, and that changes and modifications may be made in the construction and combination of the several elements without departing from the scope of my invention as defined in the appended claims.

I claim—

1. A chuck for holding a work blank on a work support, comprising in combination, a cage member, radially movable jaws therein, resilient means supporting said cage member, and an element movable relative to said cage member to first force said jaws outwardly into engagement with the work blank and then in a direction to force the work blank toward its support.

2. A chuck for holding a work blank on a work support, comprising in combination, a cage member, radially movable jaws therein, resilient means supporting said cage member, and an element adapted to engage the inner ends of the jaws and movable relatively to said cage member in one direction to force said jaws outwardly into engagement with the work blank.

3. A chuck for holding a work blank on a work support, comprising in combination, a cage member, radially movable jaws therein, resilient means for supporting said cage member, an element adapted to engage the inner ends of the jaws and movable relatively to said cage member in one direction to force said jaws outwardly into engagement with the work blank, and means to automatically return the jaws to their inoperative positions upon movement of the element in the opposite direction.

4. A chuck for holding work blanks on a work support, comprising in combination, an element extending within a central bore of the work blank and adapted to be forced in one direction, a cage member surrounding said element and having work engaging jaws thereon, resilient means supporting said cage member, whereby movement of said element in one direction will force the jaws into engagement with the work blank and force said work blank and said chuck toward said work support.

5. A chuck for holding work blanks on a work support, comprising in combination, an element having a conical head portion thereon extending within a central bore of the work blank and adapted to be forced in one direction, a cage member surrounding said element, work engaging jaws movably mounted thereon and having beveled portions adapted to be engaged by the conical head portion of said element, resilient means supporting said cage member, whereby movement of said element in one direction will force the jaws outwardly into engagement with the bore in the work blank and force said work blank and chuck toward said work support.

6. A chuck for holding work blanks on a work support, comprising in combination, an operating element extending within a central bore of the work blank and adapted to be forced in one direction, a cage member surrounding said element, work engaging jaws movably mounted thereon, springs normally holding the jaws toward their inoperative positions, and resilient means supporting said cage member, whereby movement in one direction of said operating element will force the jaws into engagement with the work blank and force said blank toward said work support, and movement in the opposite direction of said operating element will permit movement of the jaws to their inoperative positions.

7. The combination with a work support for vertical car wheel lathes and the like, of a permanent chuck mounted on said support adapted to hold work blanks on said support, said chuck comprising a cage member adapted to extend within a central bore of the work blank, a plurality of radially disposed jaws slidably mounted in said cage member for radial movement relative thereto, an operating element having a conical head portion adapted to reciprocate vertically within said cage member, spring means for normally holding said jaws in inoperative position, said operating element being adapted to be forced in one direction and to engage and force said jaws outwardly into engagement with the work blank.

In testimony whereof, I have hereunto set my hand.

JOHN W. BRISCOE.